(No Model.)
A. E. LYMAN.
GRUBBER.
No. 378,966. Patented Mar. 6, 1888.
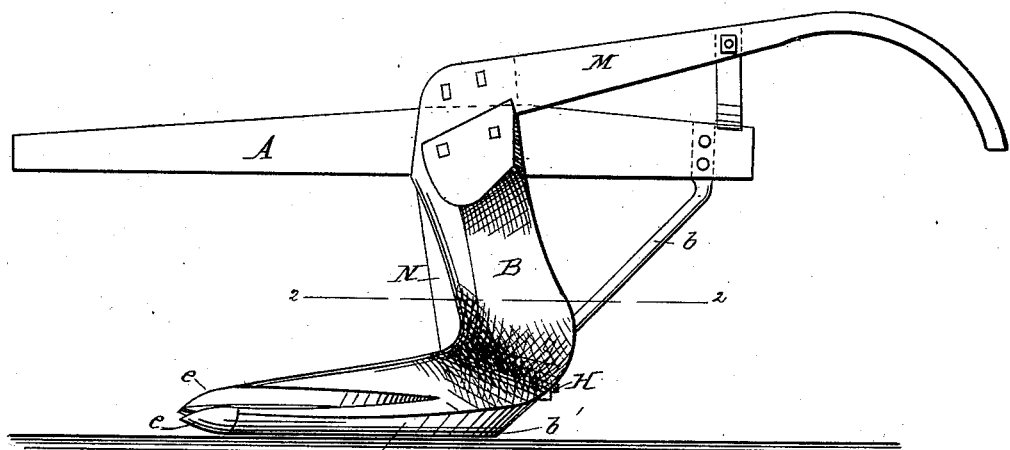
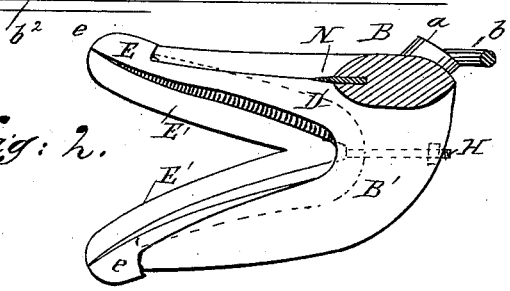
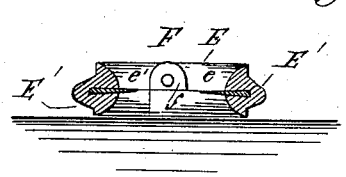
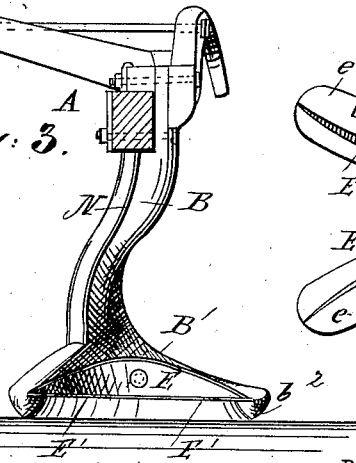
WITNESSES:
Chas. Nida
C. Sedgwick
INVENTOR:
A. E. Lyman
BY Munn & Co
ATTORNEYS.

UNITED STATES PATENT OFFICE.

AUSTIN ELIAS LYMAN, OF WARREN, OHIO.

GRUBBER.

SPECIFICATION forming part of Letters Patent No. 378,966, dated March 6, 1888.

Application filed August 31, 1887. Serial No. 248,365. (No model.)

*To all whom it may concern:*

Be it known that I, AUSTIN ELIAS LYMAN, of Warren, in the county of Trumbull and State of Ohio, have invented a new and Improved Grubber, of which the following is a full, clear, and exact description.

My invention relates to an improvement in grubbers specially adapted to remove the "saw palmetto" from the surface of the ground, and has for its object to provide an implement of simple and cheap construction, whereby palmetto of any length may be effectively and expeditiously removed.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a side elevation of the implement, and Fig. 2 is a section on line 2 2 of Fig. 1. Fig. 3 is a perspective view looking from the front, the beam being in section, and Fig. 4 is a plan view of the knives and carriers. Fig. 5 is a transverse section on line 5 5 of Fig. 4.

It is the object of the present invention to provide an implement adapted to remove the the saw palmetto from the surface of the ground by cutting the roots connecting the stems with the earth. The palmetto-stems grow horizontally along the surface of the ground, at times twenty feet in length, and the entire length of the stem sends out roots from the under side deep into the ground.

To remove these stems, as aforesaid, an implement is provided consisting of a horizontal beam, A, similar to a plow-beam, to which is attached a standard, B, having a horizontal integral bifurcated base or shoe, B', the opening being to the front. The standard B is at one side of the beam A, and curved in its downward projection sufficiently to bring the lower end of the standard, where it unites with the shoe, beneath the beam, or slightly beyond the side opposite the point of attachment, as shown in Figs. 1 and 3. The standard and shoe are held steady by an inclined brace, $b$, secured near the rear end of the beam A at one end and to the rear of the shoe at one side, the connection with the shoe being substantially covered by a shield, $a$, to prevent the weeds clinging thereto.

The bottom of the shoe, including the bottom of its members, is flattened to run readily along the surface of the ground, as shown at $b'$ in Fig. 1, and the sides and rear from said flat bottom upward are made convex, as at $b^2$ in the same figure.

The inner front edge of the body of the shoe and the inner faces of its members are provided with a continuous horizontal groove, D, U-shaped in its entirety, (see dotted lines, Fig. 2,) adapted to receive a substantially U-shaped knife-carrier, E. (See Figs. 2 and 4.)

The carrier E is provided with a knife, E', horizontally and longitudinally attached centrally to the inner face, and also at each outer end with an integral projection, $e$, adapted to engage the outer ends of the shoe, whereby the ends of the carrier project beyond the ends of the shoe, as shown in Fig. 2.

The knives, when placed in position in the carrier, are made to abut at the rear, whereby an acute angle is formed at the back of the frame, permitting nothing entering the open forward end of the carrier and traveling backward to escape uncut.

Each carrier and its corresponding knife may be made of one piece of metal, constituting a knife with a thick or strong back to give it strength, without the use of a separate carrier, such knife filling the place of separate knife and carrier; but preferable construction is illustrated in Fig. 4, in which the carrier and knife (or the knife, if used alone) are made in two equal sections, $e'$ $e^2$, each section being recessed at the rear horizontally and united to form an interlocking joint, F, the leaves $f$ produced by the aforesaid recesses being united by a screw-bolt, H, passing through the same from the front to the back. When the implement is thus constructed, the knives are made in two parts—that is, one knife for each section—abutting in front of the said interlocking-joint.

When the carrier is placed in the shoe, it is retained in position by the connecting-bolt H of the carrier, also passing through the body of the said shoe out at the back, the end of the bolt being provided with a suitable nut or secured in any approved manner. The implement is provided with handles M, similar to plow-handles, attached to the standard. The carrier is made in two sections to facilitate sharpening the blades.

In operation the implement is provided with a team, and after stripping the leaves from the stem with a brush-hook or similar device the team is driven, one horse on each side of the stem, lengthwise thereof, with the knife-carrier directly under the stem, thus bringing the knives in contact with the roots. By means of the handle the shoe may be given a motion from side to side as the team moves forward, thereby rendering it easier for the team in working and facilitating the cutting of the roots.

A colter or vertical blade, N, is affixed in the front edge of the standard in any approved manner to cut any transverse roots or vines that might come in the path of the shoe.

It will be observed that by reason of the curve in the standard, by means of which the angles of the knives are brought in substantial alignment with the side of the beam to which the standard is attached, that the stem being cut is permitted to pass unobstructed over the shoe, and the progress of the implement is thereby uninterrupted, and that the stem is also carried away from the operator.

Other power than that set forth may be applied to the machine to propel the same—as, for instance, steam—and the shoe may be attached to the beam at either or both sides, or at any point in its length, as circumstances may demand, without departing from the spirit of the invention.

Having thus described my invention, what I claim as new, and desire to secure by Letters Patent, is—

1. The combination, with the beam, of the depending standard, and a V-shaped shoe secured or connected at the rear end of one side to the lower end of the standard and provided with the V-shaped knife above its bottom face, substantially as set forth.

2. The combination, with the beam A, of the standard B, depending therefrom and curved thereunder, the V-shaped shoe B' at one side of the lower end of the beam, and the knife secured within the shoe above its lower face, substantially as set forth.

3. The combination, with the beam A, of the standard B, the V-shaped shoe B' at the lower end of the standard, and provided between its upper and lower faces with the groove D, the two-part carrier E within said groove, and the knife or cutter secured by said carrier, substantially as set forth.

4. The combination, with the beam A, of the standard B, the V-shaped shoe integrally connected at one side at its rear end with the lower end of the standard and having the groove D between its upper and lower faces, the knife-carrier E, formed of the sections $e'$ $e^2$, having an interlocking joint, F, at their rear ends, and the knife sections having projections $e$ engaging the outer ends of the shoe, and the bolt H, securing the knife-sections and the carrier at the rear end of the shoe, substantially as set forth.

AUSTIN ELIAS LYMAN.

Witnesses:
J. R. CHAMBERLAIN,
RALPH DENNISON.